United States Patent [19]

Bates et al.

[11] Patent Number: 5,532,715

[45] Date of Patent: Jul. 2, 1996

[54] VISUALLY AGING SCROLL BAR

[75] Inventors: Cary L. Bates; Jerry A. Blades; Harvey G. Kiel, all of Rochester; Raymond F. Romon, Oronoco; Jeffrey M. Ryan, Byron, all of Minn.

[73] Assignee: International Business Machines Corporation, Armonk, N.Y.

[21] Appl. No.: 959,315

[22] Filed: Oct. 9, 1992

Related U.S. Application Data

[63] Continuation-in-part of Ser. No. 777,867, Oct. 16, 1991.

[51] Int. Cl.$^6$ ........................................... G09G 5/34
[52] U.S. Cl. ............................................ 345/123; 395/157
[58] Field of Search ................................. 340/703, 724, 340/726, 753; 395/131, 155, 137, 155, 157, 161; 345/157, 160–167, 121, 123; 382/240, 242

[56] References Cited

U.S. PATENT DOCUMENTS

| | | | |
|---|---|---|---|
| 3,961,306 | 6/1976 | Anstey | 346/107 |
| 3,968,639 | 7/1976 | Berets et al. | 360/240 |
| 4,034,549 | 7/1977 | Danley et al. | 368/242 |
| 4,752,919 | 6/1988 | Clark | 368/242 |
| 5,023,851 | 6/1991 | Murray et al. | 345/157 |
| 5,245,590 | 9/1993 | Galison | 368/18 |
| 5,339,391 | 8/1994 | Wroblewiski et al. | 345/123 |

OTHER PUBLICATIONS

IBM Patent Application–DA990–015 "Graphical Method of Indicating the Position of and Performing an Operation on a Plurality of Selected objects in a Computer System", R. J. Torres et al.

IBM Patent Application–Y0989–130 "Scrollbar Having System or User Provided Information", V. J. Cina, Jr. et al.

*Primary Examiner*—Ulysses Weldon
*Assistant Examiner*—Amare Mengistu
*Attorney, Agent, or Firm*—Curtis G. Rose; Steven W. Roth

[57] ABSTRACT

A visually aging scroll bar is associated with a window or viewport on a computer display as part of a computer system, and contains a slider to indicate relative positioning in the window of a document, such as a data file, image file, audio file, text file, or spreadsheet. The current position of the scroll bar slider is monitored by the computer system. After a first predetermined sampling period has elapsed, a first region matching the current position of the scroll bar slider is created. The visual appearance of the region is determined by a predetermined region heating rate. For example, a newly created region starts at "cold", which can be indicated by a violet-indigo color. After a second sampling period has elapsed, the computer system again checks the current position of the scroll bar slider. If the current position still matches the first region, the visual appearance of the first region symbolically "warms up" as indicated by the region heating rate. This incrementally changing visual appearance (for example, from violet to indigo, blue, green, yellow, orange and finally a deep red) continues for as long as the current slider position matches the first region, up until a maximum region symbolic "temperature" is reached.

13 Claims, 13 Drawing Sheets

| Scroll Bar Parameters | | | |
|---|---|---|---|
| Aging Scroll Bar | X ON | _OFF | |
| Minimum Document Size | __300_ | lines | |
| Sampling Rate | __20_ | seconds | |
| Region Heating Rate | _10 | degrees | |
| Region Cooling Rate | __5 | degrees | |
| Maximum Region Temp | 100 | degrees | |
| Suspend Sampling? | _ YES | X NO | |
| Save Regions? | X YES | _ NO | |
| Exposure Mode | X DIRTY | _ SLIDER | |

FIG. 4A

| Temperature | Visual Appearance | Color Name |
|---|---|---|
| 0 | | Violet |
| 10 | | Violet-Indigo |
| 20 | | Indigo-Blue |
| 30 | | Blue |
| 40 | | Blue-Green |
| 50 | | Green-Yellow |
| 60 | | Yellow |
| 70 | | Yellow-Orange |
| 80 | | Orange-Red |
| 90 | | Red |
| 100 | | Dark Red |

Change Scroll Bar Colors

FIG. 4B

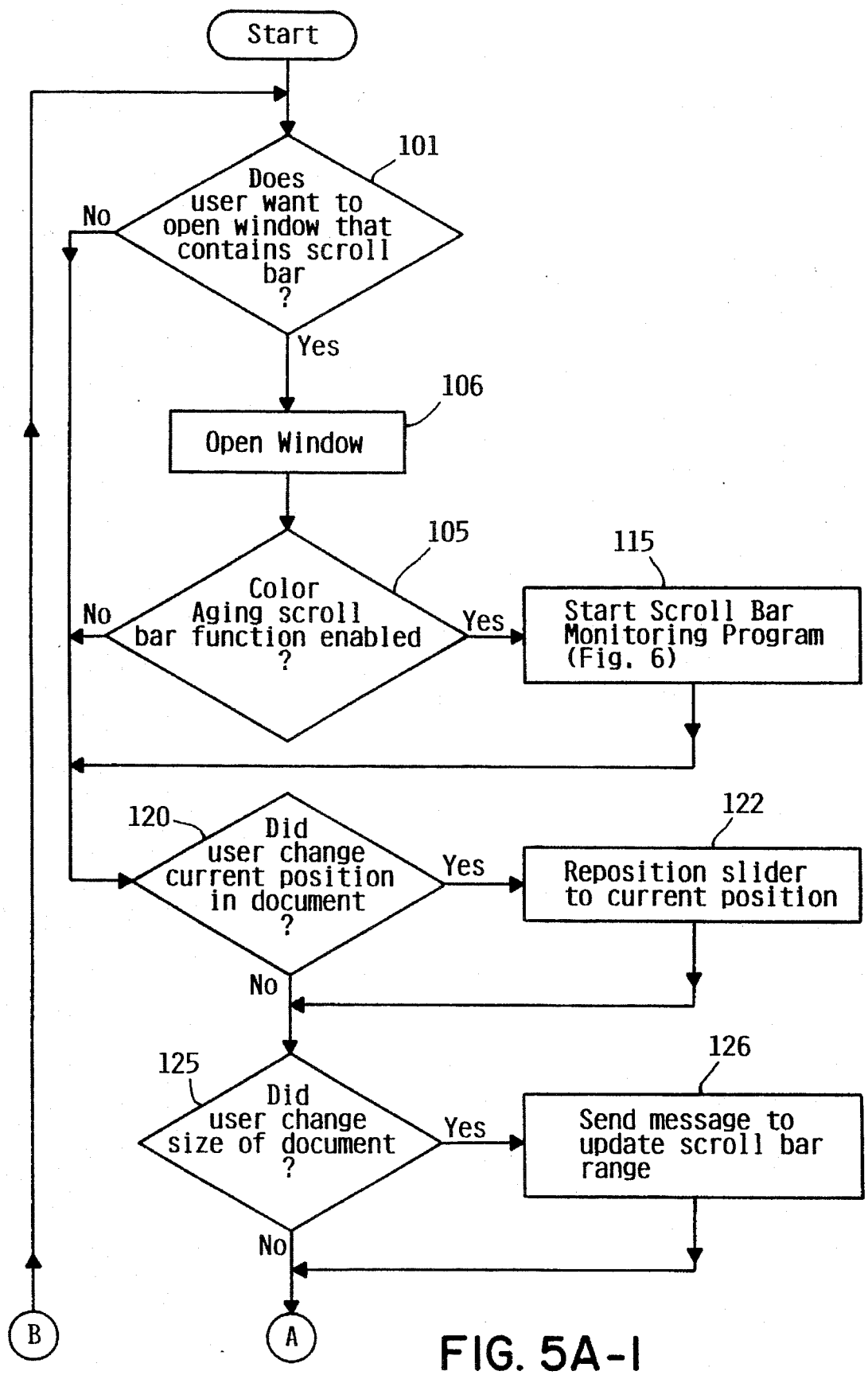
FIG. 5A-I

Event Based Scroll Bar Parameters

| | |
|---|---|
| Event Based Aging | X ON  _ OFF |
| Minimum Document Size | _300_ lines |
| Heating Factor | _30_ degrees/minute |
| Cooling Factor | _15_ degrees/minute |
| Maximum Region Temp | 100 degrees |
| Save Regions? | X YES  _ NO |
| Exposure Mode | X DIRTY  _ SLIDER |

FIG. 7

VISUALLY AGING SCROLL BAR

This application is a continuation-in-part of application Ser. No. 07/777,867, filed Oct. 16, 1991.

FIELD OF THE INVENTION

This invention relates to the data processing field. More particularly, this invention relates to a scroll bar associated with a display window that provides a view into a presentation space.

BACKGROUND OF THE INVENTION

In the early days of the personal computer, browsing or editing a document was difficult to do. The document would often take up several screens worth of information, and it was difficult for the user to find specific sections of the document. The user would often have to scroll through an entire document screen by screen by pressing function keys assigned to a "scroll up" and "scroll down" function in an often futile attempt to find a specific section. This was slow and cumbersome, and resulted in many users printing off the entire document instead of trying to view it on the display. This was a waste of valuable natural resources, and was a giant step backwards in the often expressed goal of reaching a paperless office.

Some early editors attempted to partially solve this problem by providing a "search" or "find" function. While somewhat helpful, these functions depended on a user knowing a specific (and reasonably unique) word or string of words that is contained in the specific section he is looking for. This approach often turned into a guessing game for a user, and often resulted in the user again giving up and printing off the entire document. In addition, many users simply did not know (or couldn't remember) any specific word or string of words in the section they were looking for.

It was thought that problems like the above would be solved by a great panacea called a "graphical user interface", first introduced to the market by Apple, and later adopted by Microsoft with its "Windows" program and by IBM with OS/2 and Presentation Manager. One common feature of these graphical interface programs is a scroll bar. A scroll bar is commonly associated with a display window, and is most useful when only a small portion of a document can be displayed in a display window at any one time. The scroll bar contains what is known as a "slider". The slider's relative position in the scroll bar graphically indicates the relative position of the entire document that is currently displayed in the display window. One scroll bar is often used to indicate relative vertical position, while a second scroll bar can be used to indicate relative horizontal position.

A scroll bar is normally used in conjunction with an input device such as a mouse, track ball, or light pen. When a user wants to move to a different section of a document, he can either move the mouse cursor to a new position on the scroll bar (click operation), or can place the mouse cursor on the slider, press and hold one of the mouse buttons, and move the mouse cursor either one side or the other of the slider (drag operation). While both of these operations are helpful in rapidly moving from one section of a document to another section, they don't do much to help a user find the specific section of the document he is looking for.

Some techniques are known in the art to enhance the operation of a scroll bar to make it easier for a user to find a specific section he is looking for. One such technique is described in pending patent application Ser. No. 07/531,213, filed on May 31, 1990 by the assignee of this invention and entitled "Scrollbar Having System or User Provided Information". This application discloses displaying indicia such as alphanumeric symbols within a scroll bar to assist a user find a specific section in a document. For example, if the document contained in the window was a dictionary, the scroll bar disclosed in this application could contain some or all of the letters "A" through "Z". If the user wanted to look up a specific word that started with "P", for example, he could simply move the mouse cursor to the "P" portion of the scroll bar and click on the mouse button. While this technique is very useful in making it easier to find a specific section in a document, it is quite complex and highly dependent on the contents of the document itself, since different documents would require that different indicia be displayed in the scroll bar to be useful. In addition, documents such as image or data files are not organized in a manner that would allow this technique to be used.

Another technique for enhancing the operation of a scroll bar is described in pending patent application Ser. No. 07/619,628, filed on Nov. 28, 1990 by the assignee of this invention and entitled "Graphical Method of Indicating the Position of and Performing an Operation on a Plurality of Selected Objects in a Computer System". This application discloses placing a marker icon in a scroll bar when an object in a window is selected. This technique makes it easier for a user to quickly scan previously visited areas of a document. While helpful, this technique loses much of its effectiveness if multiple areas of a document are selected, since the scroll bar quickly fills up with marker icons that have less and less meaning. In addition, this technique contains no indication as to when, how long, or how often a specific area of the document has been viewed.

SUMMARY OF THE INVENTION

It is a principal object of the invention to enhance the operation of a scroll bar.

It is another object of the invention to provide an enhanced scroll bar so that users are able to quickly locate a specific section of the document.

It is another object of the invention to provide an enhanced scroll bar that makes it easier for a user to find a specific section of the document that has been viewed frequently or for long periods of time.

These and other objects are accomplished by the visually aging scroll bar disclosed herein. A visually aging scroll bar is associated with a window or viewport on a computer display as part of a computer system, and contains a slider to indicate relative positioning in the window of a document, such as a data file, image file, audio file, text file, or spreadsheet. The current position of the scroll bar slider is monitored by the computer system. After a first predetermined sampling period has elapsed, a first region matching the current position of the scroll bar slider is created. The visual appearance of the region is determined by a predetermined region heating rate. For example, a newly created region starts at "cold", which can be indicated by a violet-indigo color.

After a second sampling period has elapsed, the computer system again checks the current position of the scroll bar slider. If the current position still matches the first region, the visual appearance of the first region symbolically "warms up" as indicated by the region heating rate. This incrementally changing visual appearance (for example, from violet to indigo, blue, green, yellow, orange and finally a deep red)

continues for as long as the current slider position matches the first region, up until a maximum region symbolic "temperature" is reached.

As the user moves the slider of a scroll bar, the scroll bar becomes "dirty" as an indication of where the user has been previously. Portions of the document with high usage are represented by "hotter" colors (reds & yellows) on the scroll bar. Portions of the document with low usage are represented by "cooler" colors (blues & greens) on the scroll bar. This visually aging scroll bar makes it very easy for a user to return to previously visited portions of the document.

If the current position has moved outside of the first region, a second region is created containing the new current position. As long as the current position remains in the second region, the color of the first region is "cooled" by a predetermined region cooling rate, while the color of the second region is "warmed" by a predetermined region heating rate. This continues until the temperature of the first region is reduced to a minimum region temperature and its color disappears (by becoming the same color as the underlying scroll bar), and until the temperature of the second region reaches a maximum region temperature.

The computer system continues to monitor the current position of the scroll bar slider as long as the document is in use, or until a suspend sampling indication is received from the user. Once work on the document is completed, the computer system saves the present state of all active regions of the scroll bar in storage for the next time the document is used.

BRIEF DESCRIPTION OF THE DRAWING

FIGS. 4A–4B show exemplary screens used to set scroll bar parameters and change color selections.

FIGS. 5A1, 5A2, 5B, 6A and 6B show the flowcharts of the operation of the scroll bar of the invention.

FIG. 7 shows the scroll bar parameters for the first alternate embodiment of the invention.

DESCRIPTION OF THE PREFERRED EMBODIMENT

Commonly assigned co-pending U.S. patent application entitled "Non-Linear Scroll Bar", Ser. No. 07/777,842, is related to this patent application and is hereby incorporated by reference.

Figure 1:
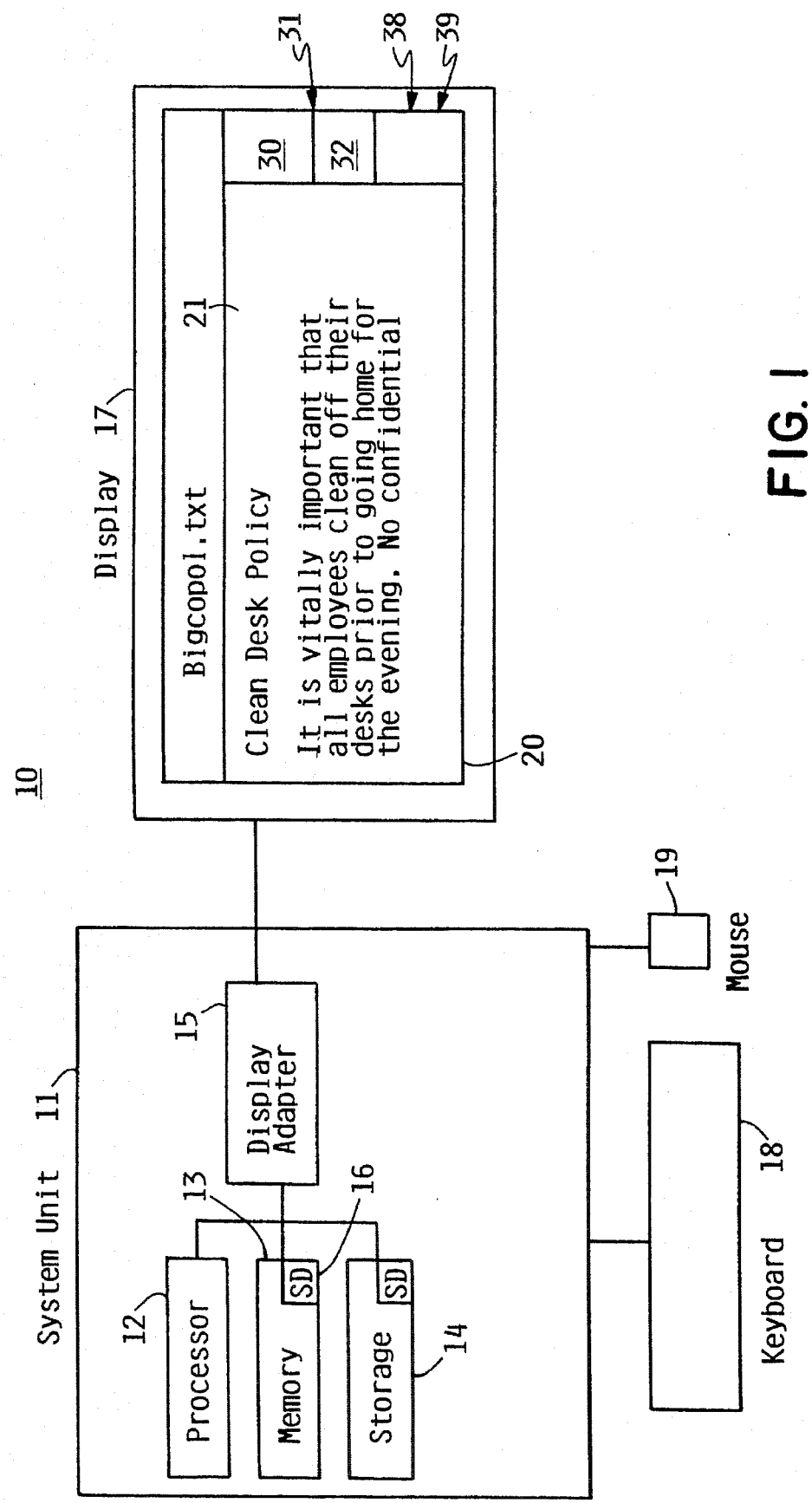
FIG. 1 shows a block diagram of the computer system of the invention.

FIG. 1 shows a block diagram of computer system 10 of the invention. Computer system 10 has display 17, keyboard 18, and input device 19, each of which is connected to system unit 11. System unit 11 contains processor 12 connected to memory 13, storage 14, and display adapter 15. Processor 12 is suitably programmed to carry out this invention, as described in more detail in the flowcharts of FIGS. 5 and 6.

In the preferred embodiment, computer system 10 is an IBM PS/2, where processor 12 is an Intel 80386 microprocessor. Display adapter 15 is an IBM 8515 display adapter, and display 17 is an IBM 8515 display. Input device 19 is preferably an IBM mouse but may also be a track ball, light pen, or other input device. Storage 14 is a magnetic hard disk file and contains operating system software, preferably OS/2 with Presentation Manager but optionally Microsoft Windows, as well as preferably one or more OS/2 application programs such as Word Perfect or optionally DOS application programs such as Microsoft Word for Windows. When running, these programs are partially or completely installed in memory 13 and executed by processor 12.

Computer system 10 could also be another type of computer system, whether it be another microcomputer such as an Apple Macintosh, a minicomputer such as an IBM AS/400, or a mainframe computer such as an IBM System/390, and still fall within the spirit and scope of this invention. In addition, computer system 10 can be a microcomputer such as described above, connected to a larger computer system such as an IBM AS/400.

Display 17 contains window 20. For the purposes of this invention, a "window" or viewport can occupy anywhere from substantially all of the display screen to a very small portion of the display screen, and may be displayed in conjunction with (possibly overlaying portions of) other windows in a multi-tasking environment such as OS/2, or be by itself in a single-tasking environment such as DOS. A portion of document 21 is displayed in window 20. Hereinafter, the name "document" shall be used to refer to any data file, text file, image file, audio file, spreadsheet, etc, that cannot be fully displayed or otherwise represented in window 20. Window 20 also contains scroll bar 30. Scroll bar 30 has slider 32. The relative position of slider 32 in scroll bar 30 indicates the relative position of document 21 currently displayed in window 20.

For illustrative purposes, document 21, a portion of which is shown in window 20 of FIG. 1, is part of a Policy and Procedures manual for a hypothetical large corporation. Our hypothetical large corporation has deemed that this manual be reviewed on a regular basis by all employees. To save paper, employees must review the document on-line and must not even think about printing off the whole document.

Figure 2:
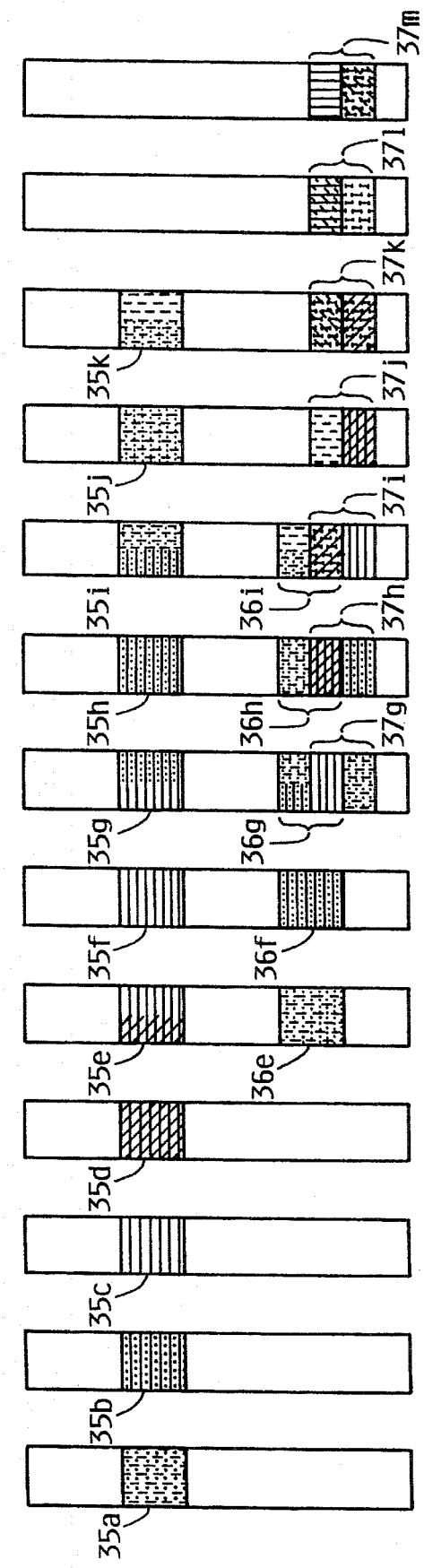
FIG. 2 shows how aging regions of a scroll bar are created and incrementally change their visual appearance based on the current position of the scroll bar slider.
Figure 3A:
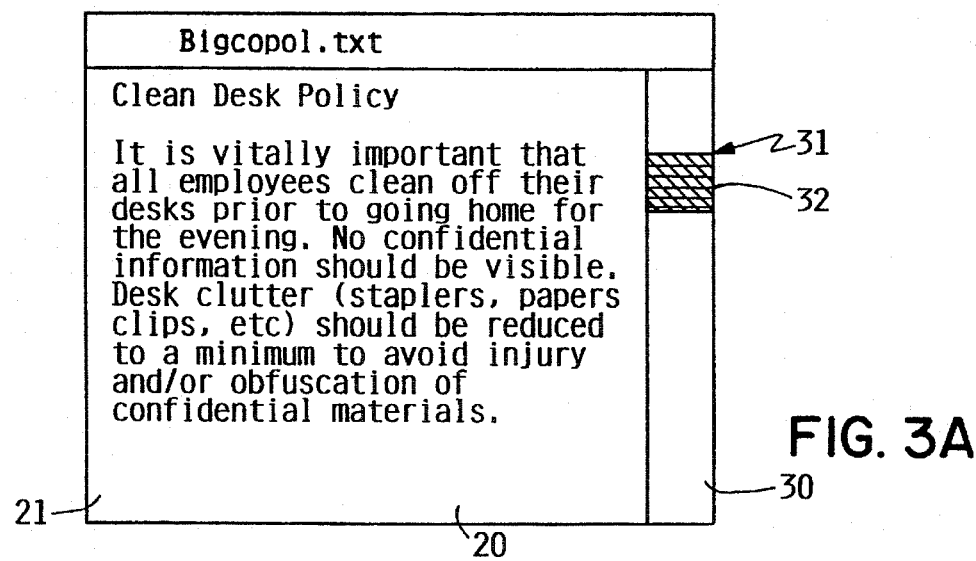
FIGS. 3A–3C shows how a specific section of a document that has been used for a period of time can be found again by examination of the visual appearance of the scroll bar slider.

FIG. 2 shows how aging regions of a scroll bar are created and incrementally change visual appearance based on the current position in a document, as a function of elapsed time. This figure will be discussed in conjunction with FIGS. 3A–3C and FIGS. 4A–4B. For purposes of illustration, let's assume that our user is reviewing the Policy and Procedures manual. The document is linearly represented through the scroll bar. For example, if a user wanted to go to the middle of section 5 of the manual, he would use a drag operation to move his mouse pointer to point 31 of scroll bar 30. Slider 32 would move to point 31 on scroll bar 30. FIG. 3A shows the section of document 21 visible to our user in window 20, and shows the location of slider 32 at point 31 of scroll bar 30.

FIG. 2 shows how a first region is created and displayed on scroll bar 30 in the preferred embodiment of the invention. The position of slider 32 is the "current position". After a first sampling rate has elapsed (set to be 20 seconds, as shown in FIG. 4), the first region for this document is created, as shown by the reference numeral 35b. Region 35b has an upper and a lower boundary that match the upper and lower boundaries of the current position of slider 32. The initial region color is determined by the specified region heating rate, as mapped to the available colors in the computer system. For example, if the computer system is capable of displaying 256 colors, some or all of these colors are arranged in order from "cold" to "hot", preferably by following the light spectrum in reverse order (violet, indigo, blue, green, yellow, orange, red).

Those skilled in the art understand that the use of the terms "temperature", "heating" and "cooling" throughout this description are meant to be symbolic indications of usage and not actual physical changes of thermal characteristics of the scroll bar, display, or computer system. Therefore, "temperature", "heating", and "cooling" shall be deemed short hand representations of "symbolic temperature" "symbolic heating" and "symbolic cooling", respectively.

The preferred embodiment allows the user to select indicators of symbolically warmer and cooler temperatures, such as by changing the default colors, as is shown in FIG. 4B. This feature would be particularly advantageous to color-blind users. Those skilled in the art realize that in the event the display attached to the computer is unable to display a wide range of colors (i.e. a monochrome display), the different temperature levels can be represented by gray scales or other forms of shading and still fall within the spirit and scope of this invention. In our example, a 10° region heating rate has been specified, as shown in FIG. 4A. Therefore, region 35b is initially a violet-indigo color.

Another 20 seconds goes by. Since our user is reading this section of the document carefully, he has not moved the slider from this portion of the document. Since the current position of the document is still within the first region, the color of the first region becomes "warmer" by the amount of the predetermined region heating rate. Since a 10° region heating rate was specified (FIG. 4A), the color of the first region changes from violet-indigo to indigo-blue.

Regions 35c and 35d show the region changing color from indigo-blue to blue to blue-green as two more sample periods elapse (as indicated in the monochrome environment of a patent drawing by increasingly darker shading).

Figure 3B:
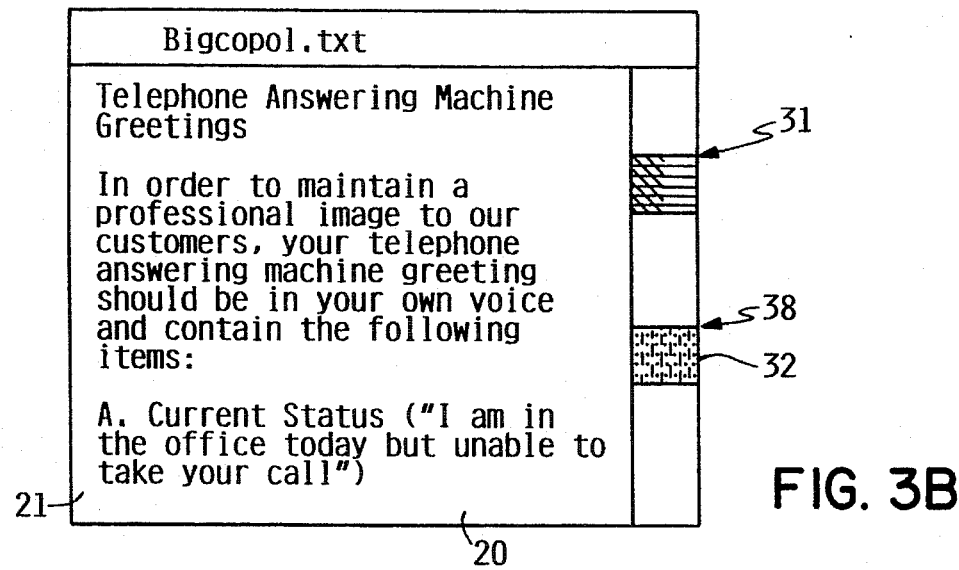
Figure 3C:
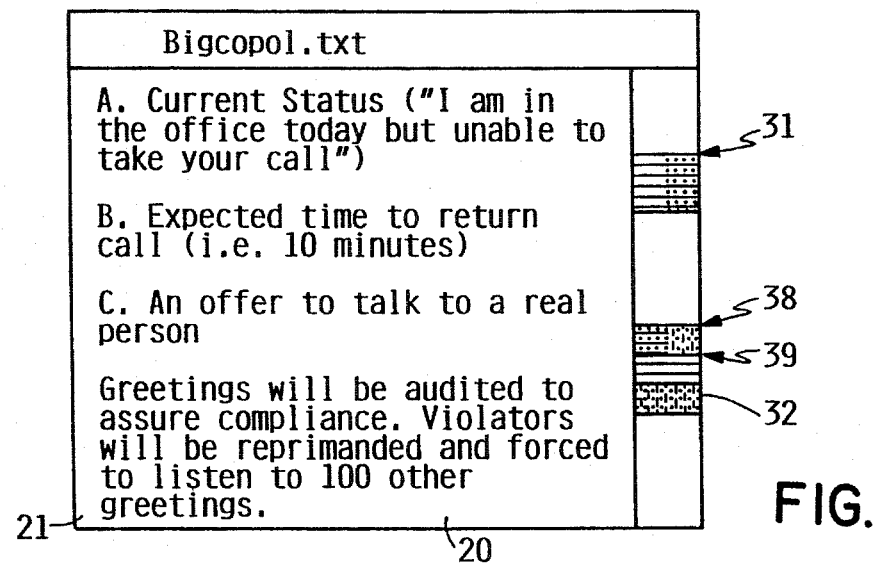

Our user now wants to take a look at another section of the manual. He moves his mouse pointer (via a drag operation in the preferred embodiment) down to point 38 of scroll bar 30 (FIG. 3B). The current position of the slider moves to this point and the portion of the document now displayed to our user is shown in FIG. 3B. Another 20 seconds goes by. A second region for this document is created, as shown by the reference numeral 36e. The initial color of region 36e is again determined by the specified region heating rate. In our example, this color is again violet-indigo. Since the current position is no longer in the first region, the color of the first region "cools down" by the region cooling rate of 5° specified in FIG. 4A. Therefore, the color of our first region changes slightly from blue-green to a color closer to blue.

Our user stays at this position for one more sample period as shown by regions 35f and 36f. Our user then moves the slider down slightly to point 39 (FIG. 3B). Since this move changed the current position of the slider, a new region is created at the next sampling period (region 37g) that overlaps region 36g. Note that the overlapping portion of these regions has a "warmer" color than the non-overlapping portions, and is indicated by the color associated with the temperature of the overlapping regions added together. This correctly identifies the overlapping portion of the region as a "hotter" part of the document (i.e., one with higher usage) and makes this portion easier to find.

FIG. 2 shows how regions 35 and 36 continue to cool down as our user stays at point 39, while region 37 continues to warm up. When a region cools down to 0°, it effectively disappears by becoming the same background color as the scroll bar (violet, in the preferred embodiment). The last sample time period in FIG. 2 shows that regions 35 and 36 have disappeared, while region 37 has become a yellow-orange color.

FIG. 4A shows the scroll bar parameters, most of which have been previously discussed. These parameters are normally assigned default values, but can be presented to the user upon demand for possible modifications. The first parameter asks whether the aging scroll bar should be on or off. There may be instances where the user would prefer that the scroll bar operate in a conventional (non-aging) fashion. The next parameter specifies a minimum document size. Since many of the advantages of an aging scroll bar are lost with small documents, this function is disabled for documents smaller than the specified minimum size. The next three parameters—sampling rate, region heating rate, and region cooling rate, have already been discussed. Completely different results can be obtained based on how these parameters are selected. This flexibility can be used to closely fit a user's specific situation. For example, if it is desirable to have regions change color very slowly over time, a user might want to set a sample rate of 5 minutes and a region heating rate of 1°.

The next parameter asks if a user wants to suspend sampling. This parameter can be selected via the screen shown in FIG. 4, or a special key sequence can be set up to toggle this parameter on or off. This parameter could be quite useful to minimize the effects of bathroom breaks or other interruptions on the aging nature of the scroll bar. The next parameter asks if the regions created during the viewing of this document should be saved when the document is no longer in use. If so, historical information about how the document has been used is maintained from session to session, and the temperature of the regions are written to storage 14 of FIG. 1. If not, all regions are erased when the document is exited, and the scroll bar is initialized to its background color the next time this document is accessed.

The last parameter asks if the user wants to use the scroll bar exposure mode or the slider exposure mode. The scroll bar exposure mode is what has been discussed thus far, where the scroll bar becomes "dirty" as portions of the document are visited. In this mode, the slider is at least partially transparent so as not to cover the colors of the regions in the scroll bar. The slider exposure mode changes the color of the slider as it passes over the various regions. The colors of the regions themselves are not displayed on the scroll bar until the slider is directly overhead.

The operation of this invention, as shown in the flowcharts of FIGS. 5–6, will now be described in more detail. Referring now to FIG. 5, block 101 asks if the user has requested that a window be opened that contains a scroll bar. If so, block 106 opens the window in a conventional manner. In the preferred embodiment, Presentation Manager performs this step. Block 105 checks to see if the aging scroll bar function (FIG. 4) is enabled. If so, block 115 starts the scroll bar monitoring program, shown in FIG. 6. Note that the program shown in FIG. 5 executes concurrently with the program shown in FIG. 6.

Referring now to FIG. 6, block 201 checks to see if block 185 of FIG. 5 has indicated that the monitoring program should be stopped. If so, the program ends in block 299. If not, block 204 checks to see if it has received an indication from the user (FIG. 4) that the sampling should be suspended. If such an indication has been received, the program loops back to block 201. If no such indication has been received, flow of control moves to block 210. Block 210 checks to see if the sample period specified in FIG. 4 has elapsed. If not, flow of control goes back to block 201. If a sample period has elapsed, block 215 checks to see if the document size (determined by Presentation Manager) is greater than the minimum document size specified in FIG. 4. If not, flow of control goes back to block 201. The program could optionally end if block 215 is answered negatively, but since a document could start off smaller than the minimum document size but grow bigger than the minimum document size as it is edited, it is more appropriate to loop through blocks 201, 204, 210, and 215 checking for this condition.

If block 215 is answered positively, block 220 checks a portion of memory 13 referred to as "scroll data" to see if one or more regions are specified for this document. If there is no "scroll data" in memory 13, block 220 checks to see if there is any "scroll data" in storage 14 saved from a previous session with this document (block 181 of FIG. 5B). If there is "scroll data" in storage 14, this "scroll data" is copied into memory 13. "Scroll data" contains the upper and lower boundaries and the current "temperature" of each region.

If a region is specified in scroll data, this region is passed on to block 225. Block 225 checks to see if the current slider position matches this region. In the preferred embodiment, the slider must have exactly the same boundaries as this region, since overlapping regions are supported and are an important aspect of this invention. If so, flow of control goes back to block 220 to look for more regions, effectively skipping this region. If not, it is appropriate to "cool" the temperature of this region, since the current slider position does not match this region. Block 227 cools this region by the region cooling rate. For example, if our region was 40°, block 227 would cool it down to 35°, thereby changing the color from blue-green to a color closer to blue.

Block 230 checks to see if this region is now cooler than or equal to a predetermined minimum region temperature. In the preferred embodiment, the minimum region temperature is "hard coded" to be zero, although this could be another user-defined scroll bar parameter such as those shown in FIG. 4. If block 230 is answered affirmatively, block 232 removes the region from scroll data. In either event, flow of control returns back to block 220, where the next region is passed to block 225. When block 220 determines that all the regions contained in scroll data have been processed, flow of control moves to block 250.

Block 250 asks if the current slider position matches any of the regions designated in scroll data. For example, if the current slider position has lower and upper boundaries at line 400 and line 500 of the document, block 250 would check the regions specified in scroll data to see if any of them have boundaries that match this slider position. If not, a new region needs to be created. Block 255 creates a new region having a temperature of the region heating rate specified in FIG. 4. For example, if a region heating rate of 10° was specified, this region would warm from 0° to 10° and change color from violet to violet-indigo. This newly created region is added to the list of regions contained in scroll data.

If block 250 indicates that the current slider position matches a region designated in scroll data, this means that a region has already been created and it needs to be warmed up.

Block 270 warms the region by the region heating rate specified in FIG. 4. For example, if the region that matches the slider position was at 20°, block 270 would warm it to 30°, and the color of this region would change from indigo-blue to blue.

Regardless of how block 250 is answered, block 290 ultimately checks to see if the region created exceeds the maximum region temperature specified in FIG. 4. If so, block 292 cools the region temperature to be within the maximum region temperature specified in block 292. In either event, block 295 sends a scroll bar paint event, indicating that the visual appearance of the scroll bar must be changed. This event is received and processed by block 150 of FIG. 5A, as will be discussed later. Flow of control returns to block 201.

While the monitoring program of FIG. 6 is executing, the program of FIG. 5 continues to execute as well. As previously stated, block 115 starts the scroll bar monitoring program of FIG. 6. After block 115 is executed, block 120 asks if the user changed the position in the document. This would normally be done by moving the cursor that marks the position where text or other information can be inserted into the document. If block 120 is answered affirmatively, block 122 repositions the slider (if necessary) in the scroll bar to reflect the new current position.

Regardless of how block 120 is answered, flow of control eventually goes to block 125, which asks if the size of the document has changed. The document size can change either from the addition or deletion of information, such as text. If block 125 is answered affirmatively, block 126 sends a message to update the scroll bar range. This step is conventionally performed by Presentation Manager in the preferred embodiment.

Block 150 then asks if a scroll bar paint event has been received. Scroll bar paint events indicate that the visual appearance of the scroll bar has changed, and can be generated in a conventional manner by Presentation Manager (as part of blocks 122 and 126, for example) or by block 295 of FIG. 6 as part of this invention. If so, block 155 then checks to see if the aging scroll bar feature has been enabled (FIG. 4). If not, conventional scroll bar paint processing is performed, and flow of control skips to block 175. If so, block 160 checks to see which scroll bar mode has been selected (FIG. 4). If the "dirty" scroll bar has been selected, block 165 displays each region contained in scroll data on the scroll bar in a color associated with the region temperature. Temperatures of overlapping regions are added together, and the associated color for these overlapping portions is displayed. The slider used in "dirty" scroll bar mode has a transparent portion so as not to obscure the colors of the scroll bar.

If the "slider" mode is indicated in block 160, block 168 only displays the region(s) under the current slider position in the color associated with the temperature of each region. This mode therefore changes the color of the slider itself and not the scroll bar.

Block 175 asks if the user wants to exit the window. A user normally exits a window by moving the mouse cursor to a special "exit" icon in the window and double clicking the mouse. If block 175 is answered affirmatively, block 180 asks if the user has indicated that any regions created should be saved (FIG. 4). If not, the scroll data in memory 13 is erased in block 182, and will not be available to the user the next time he accesses this document. If block 180 is answered affirmatively, block 181 writes the scroll data associated with this document to storage 14, so it can be reloaded back into memory 13 the next time this document is accessed. Block 185 stops the scroll bar monitoring program of FIG. 6. Block 188 then exits the window in a conventional manner. Block 190 then asks if all windows have been closed. If so, the program ends in block 199. If not, flow of control returns to block 101. For purposes of this patent application, changing documents within a window will be considered to be the same as closing the window and opening a new window.

The discussion thus far has primarily concentrated on a window containing a single vertical scroll bar associated with a document. The same discussion is equally applicable for a window that contains two or more scroll bars. For example, if the document in the window contains image data (i.e. a map of a city), the window would contain a horizontal as well as a vertical scroll bar. Both scroll bars would be independently executing the flowcharts of the programs shown in FIG. 5 and FIG. 6.

DESCRIPTION OF THE INVENTION

Figure 8A:
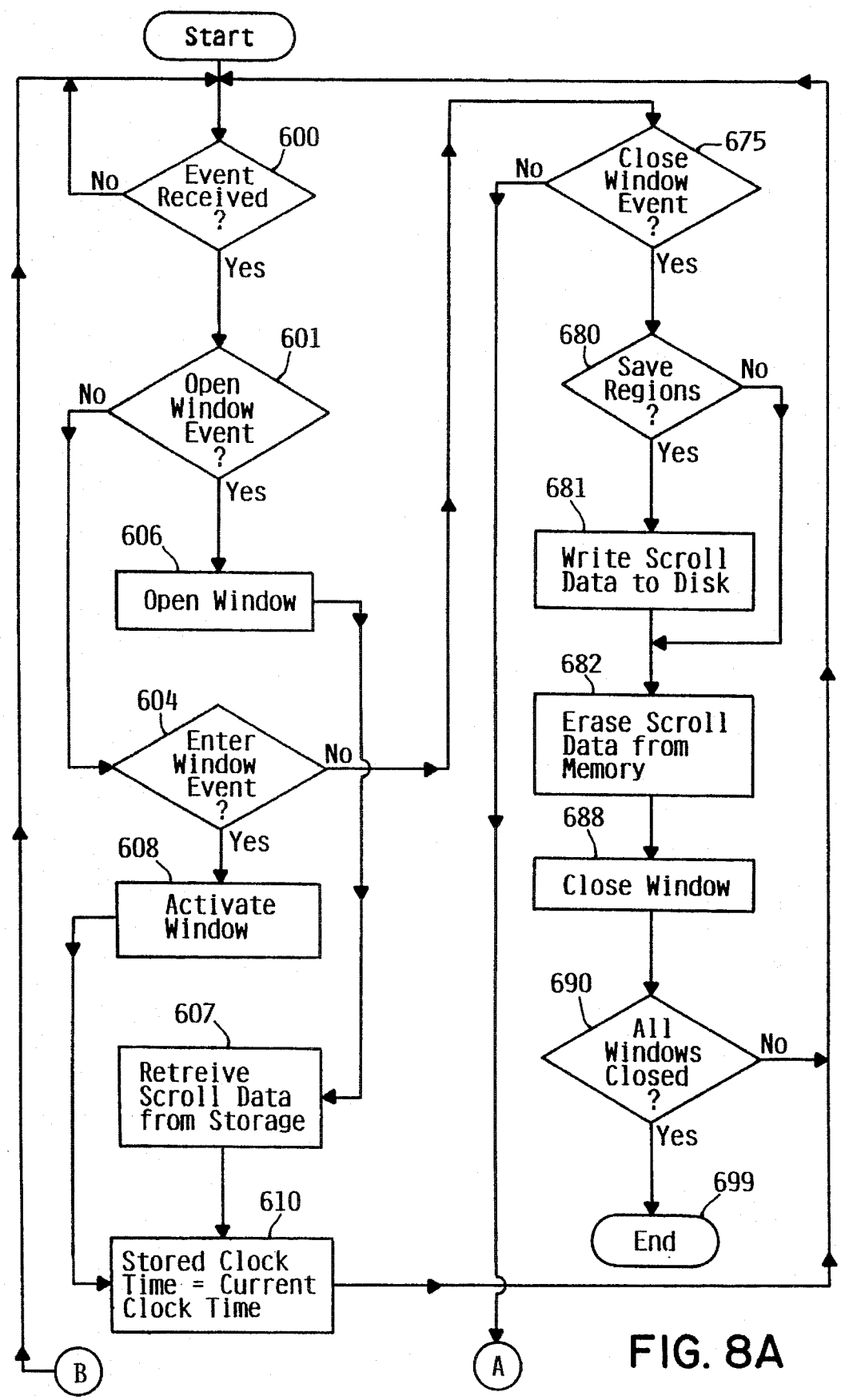
FIGS. 8A–8C show the flowcharts of the operation of the alternate embodiment of the invention.
Figure 8B:
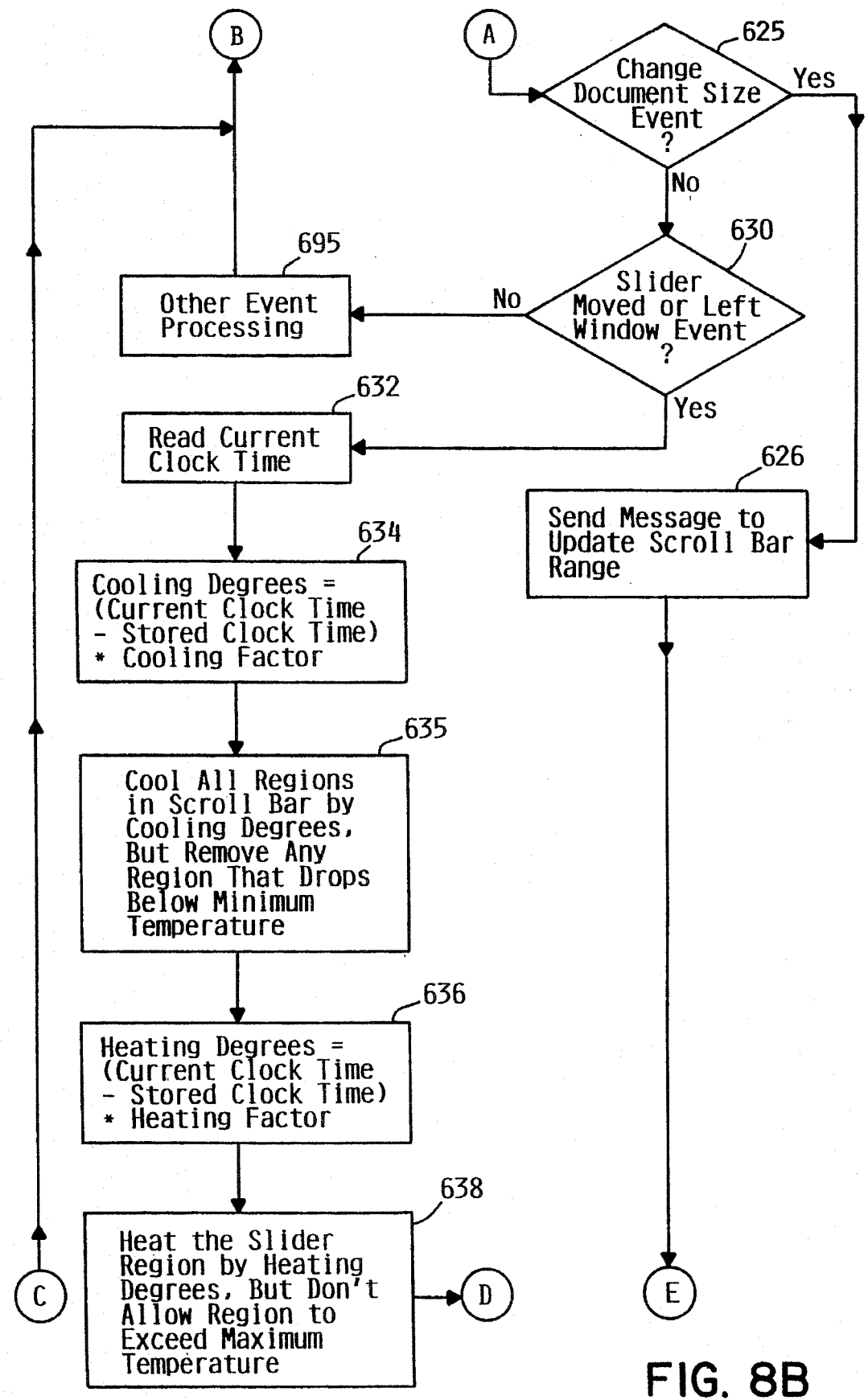

A first alternate embodiment to the invention has been contemplated and will now be discussed. This alternate embodiment performs scroll bar aging similar to that discussed above with respect to the preferred embodiment, except that this alternate embodiment addresses event based aging, whereas the preferred embodiment addresses timer based aging. Specifically, this alternate embodiment ages the scroll bar whenever the slider position moves or the input device pointer leaves the window. In contrast, the preferred embodiment ages the scroll bar whenever the specified sampling period has elapsed. The first alternate embodiment can be used in computing environments where the timing between events is sporadic and unpredictable, especially if very short and/or very long periods of time between events is expected. FIGS. 1, 2, 3A–3C, and 4B are the same for both the preferred and first alternate embodiments. FIG. 4A and the flowcharts of FIGS. 5–6 apply to the preferred embodiment. FIGS. 7 and 8A–8B apply to the first alternate embodiment, as will now be discussed.

FIG. 7 shows the scroll bar parameters for the first alternate embodiment of the invention. Since many of these parameters are the same as the parameters used for the preferred embodiment in FIG. 4A, only the parameters specific to this alternate embodiment will be discussed. The first parameter specifies whether event based aging is to be on or off. If the user prefers that the aging operate as per the preferred embodiment discussed above, event based aging is set off, and the aging scroll bar parameter in FIG. 4A is set on. If the user prefers that the aging operate as per the first alternate embodiment, event based aging is set on, and the aging scroll bar parameter in FIG. 4A is set off.

Referring again to FIG. 7, the Heating Factor parameter is similar to the Region Heating Rate parameter of FIG. 4A, except that the Heating Factor parameter is specified as degrees/minute, not degrees (implicitly, per sampling rate). A Heating Factor of 30 degrees/minute in this alternate embodiment is therefore equivalent to a Region Heating Rate of 10 degrees in the preferred embodiment, if a Sampling Rate of 20 seconds is used. Likewise, the Cooling Factor parameter is similar to the Region Cooling Rate parameter of FIG. 4A, except that the Cooling Factor parameter is also specified as degrees/minute. A Cooling Factor of 15 degrees/minute in this alternate embodiment is therefore equivalent to a Region Cooling Rate of 5 degrees in the preferred embodiment, if a Sampling Rate of 20 seconds is used. Note that no Sampling Rate parameter is specified or used in this alternate embodiment.

The operation of the alternate embodiment of the invention, as shown in the flowcharts of FIGS. 8A–8B, will now be discussed. Many of the blocks in the flowcharts of FIGS. 8A–8B are similar to blocks in the flowcharts of FIGS. 5–6 of the preferred embodiment. To assist the reader determine which of these blocks are similar, the reference numerals for FIGS. 8A–8B all are between 600–699, and the last two digits of similar blocks are the same as the 100 series reference numerals for FIGS. 5–6, where appropriate. For example, block 675 in this alternate embodiment of FIG. 8A performs a similar function to block 175 in the preferred embodiment of FIG. 5B.

The flowchart of FIG. 8A is entered if the user indicates that he wants event based aging and an "event" is received. While many activities within a windows environment are considered "events", this invention performs special processing on the following events: Open Window Event, Enter Window Event, Close Window Event, Change Document Size Event, Slider Moved Event, and Left Window Event.

Block 600 checks to see if an event is received. The first time through the flowchart, an event is received, and flow of control moves to block 601 to determine if this was an Open Window Event (in a manner similar to block 101 of the preferred embodiment). If so, block 606 opens the window in a conventional manner. Block 607 writes any scroll data saved when the window was closed from storage 14 to memory 13. Block 610 captures the Current Clock Time from the internal system clock of computer system 10 and stores this time as the Stored Clock Time for the window just opened in scroll data 16 in memory 13. If the event was not an Open Window Event but was a Enter Window Event (such as when a mouse cursor is moved into an inactive window and a mouse button is pressed to make it active) block 604 is answered positively, and block 608 activates (i.e. puts "in focus") the window. Block 610 stores the Current Clock Time for this window in scroll data. Note that scroll data stores one clock time for every opened window that has a visually aging scroll bar. Regardless of which of these two events caused block 610 to be executed, flow of control returns to block 600 to wait for another event to be received.

If the event was not a Enter Window Event, block 675 checks to see if it was a Close Window Event. If so, block 680 asks if the user has indicated that any regions created should be saved in FIG. 7. If not, the scroll data in memory 13 is erased in block 682, and will not be available to the user the next time this window is opened. If block 680 is answered affirmatively, block 681 writes the scroll data associated with this window to storage 14, so it can be reloaded back into memory 13 the next time this window is opened in block 607. Block 688 then closes the window in a conventional manner. Block 690 then asks if all windows have been closed. If not, flow of control returns to block 600. For purposes of this embodiment of the invention, changing documents within a window will be considered to be the same as closing the window and opening a new window.

Figure 8C:
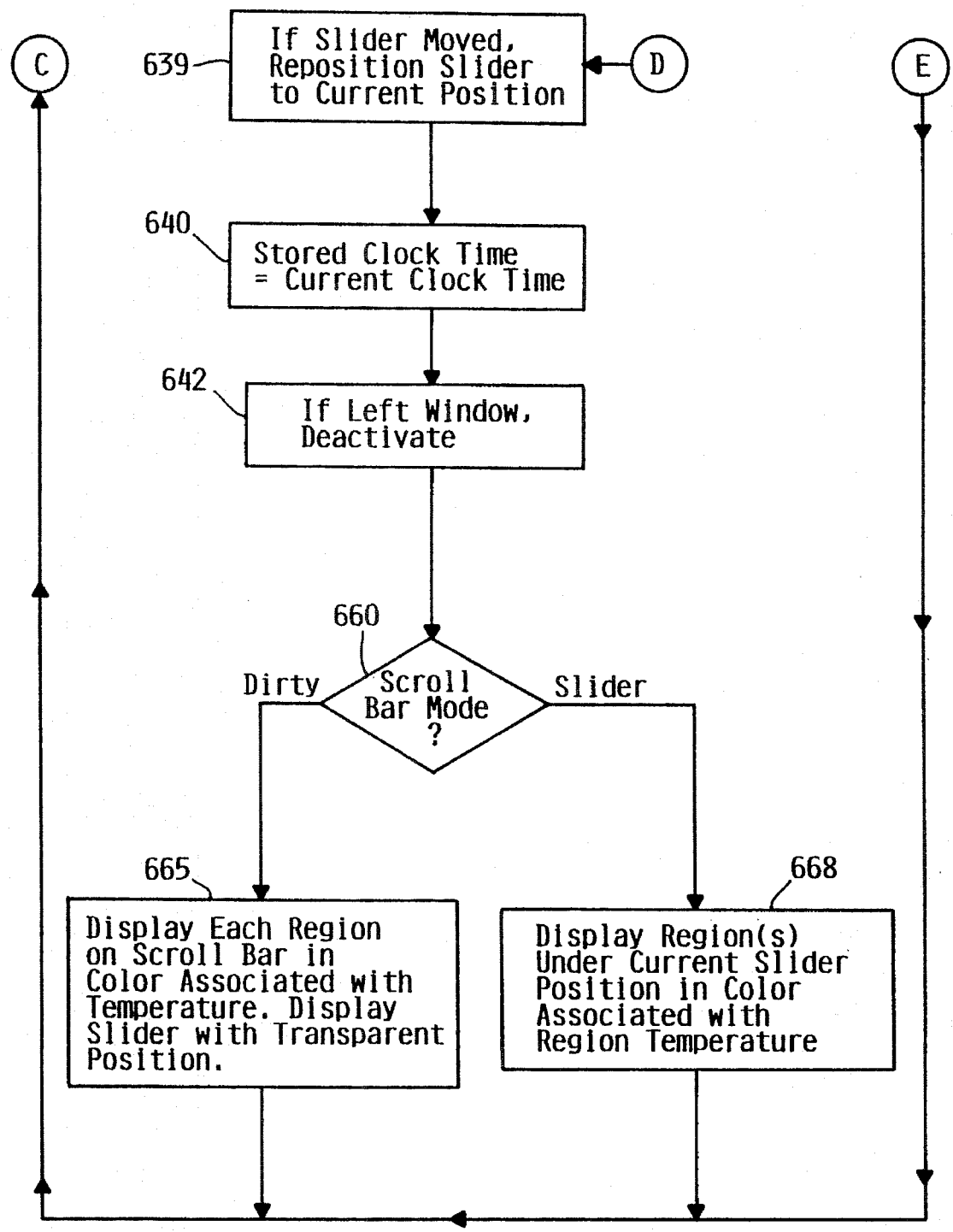

If the event was not a Close Window Event, block 625 (FIGS. 8B and 8C) determines whether it was a Change Document Size Event. If so, block 626 sends a message to update the scroll bar range, as is conventionally performed by Presentation Manager of OS/2. Flow of control then returns to block 600.

If the event was not a Change Document Size Event, block 630 checks to see if it was a Slider Moved Event or a Left Window Event. The scroll bar slider moves frequently as the user changes position within the document, such as during browsing or editing of the document. A Left Window Event occurs when the user no longer desires the window to be active, such as when the mouse cursor or other input device pointer moves to another window, and the user presses a mouse button to make the other window active. If either of these events occurred, block 632 reads the Current Clock Time from the system clock of computer system 10. Block 634 sets Cooling Degrees to be equal to (Current Clock Time—Stored Clock Time)*Cooling Factor. For example, if 30 seconds had elapsed between the Stored Clock Time (determined in block 610) and the Current Clock Time (determined in block 632), and the Cooling Factor was set at 15 degrees/minute (FIG. 7), Cooling Degrees would be 7.5 degrees.

Block 635 cools all regions in the scroll bar by Cooling Degrees, but removes regions that drop below the specified minimum region temperature, in a manner similar to the operation of blocks 220–232 in FIG. 6A.

Block 636 sets Heating Degrees to be equal to (Current Clock Time—Stored Clock Time)*Heating Factor. For example, if 30 seconds had elapsed between the Stored Clock Time (determined in block 610) and the Current Clock Time (determined in block 632), and the Heating Factor was set at 30 degrees/minute (FIG. 7), Heating Degrees would be 15 degrees.

Figure 6A:
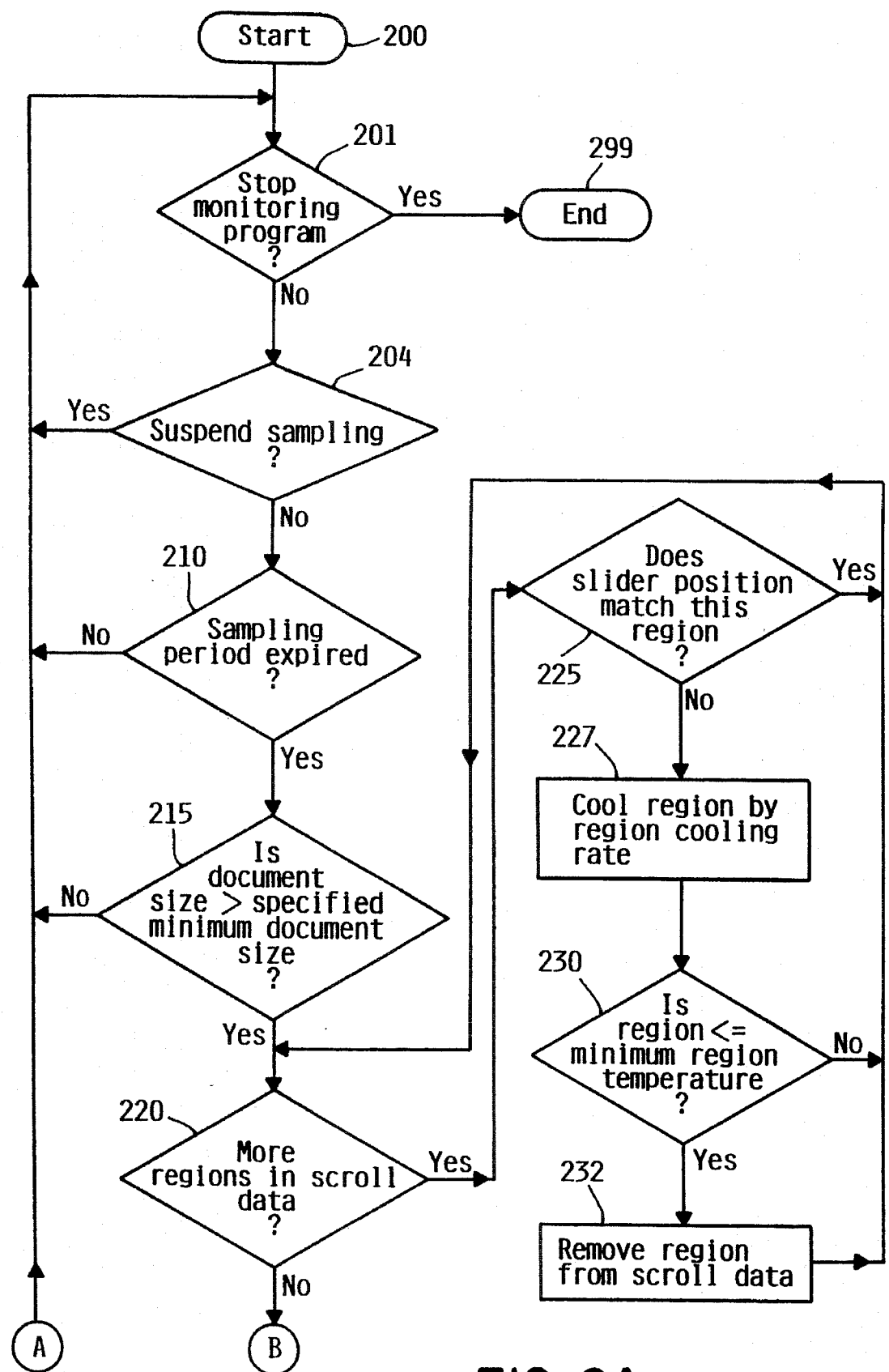

Block 638 heats the region under the scroll bar slider by Heating Degrees, but does not allow the region to exceed the specified maximum region temperature, in a manner similar to the operation of blocks 250–292 in FIG. 6A.

If the slider moved, block 639 repositions the slider to the current position. Block 640 updates the Stored Clock Time for this window by storing the Current Clock Time in scroll data 16. If block 630 was answered affirmatively because of a Left Window Event, block 642 deactivates the window, causing it to "lose focus".

Block 660 checks to see which scroll bar mode has been selected (FIG. 7). If the "dirty" scroll bar mode has been selected, block 665 displays each region contained in scroll data on the scroll bar in a color associated with the region temperature. Temperatures of overlapping regions are added together, and the associated color for these overlapping portions is displayed. The slider used in "dirty scroll bar mode has a transparent portion so as not to obscure the colors of the scroll bar. If the "slider" mode is indicated in block 660, block 668 only displays the region(s) under the current slider position in the color associated with the temperature of each region. This mode therefore changes the color of the slider itself and not the scroll bar. In either case, flow of control returns to block 600.

If the event was not a Slider Moved Event or a Left Window Event, block 630 is answered negatively, and block 695 performs conventional event processing to handle this event. When block 690 (FIG. 6A) determines that the last window has been closed, the program ends in block 699.

While this invention has been described with respect to the preferred embodiment and a first alternate embodiment, other alternate embodiments are also contemplated.

Figures 2, 5A:
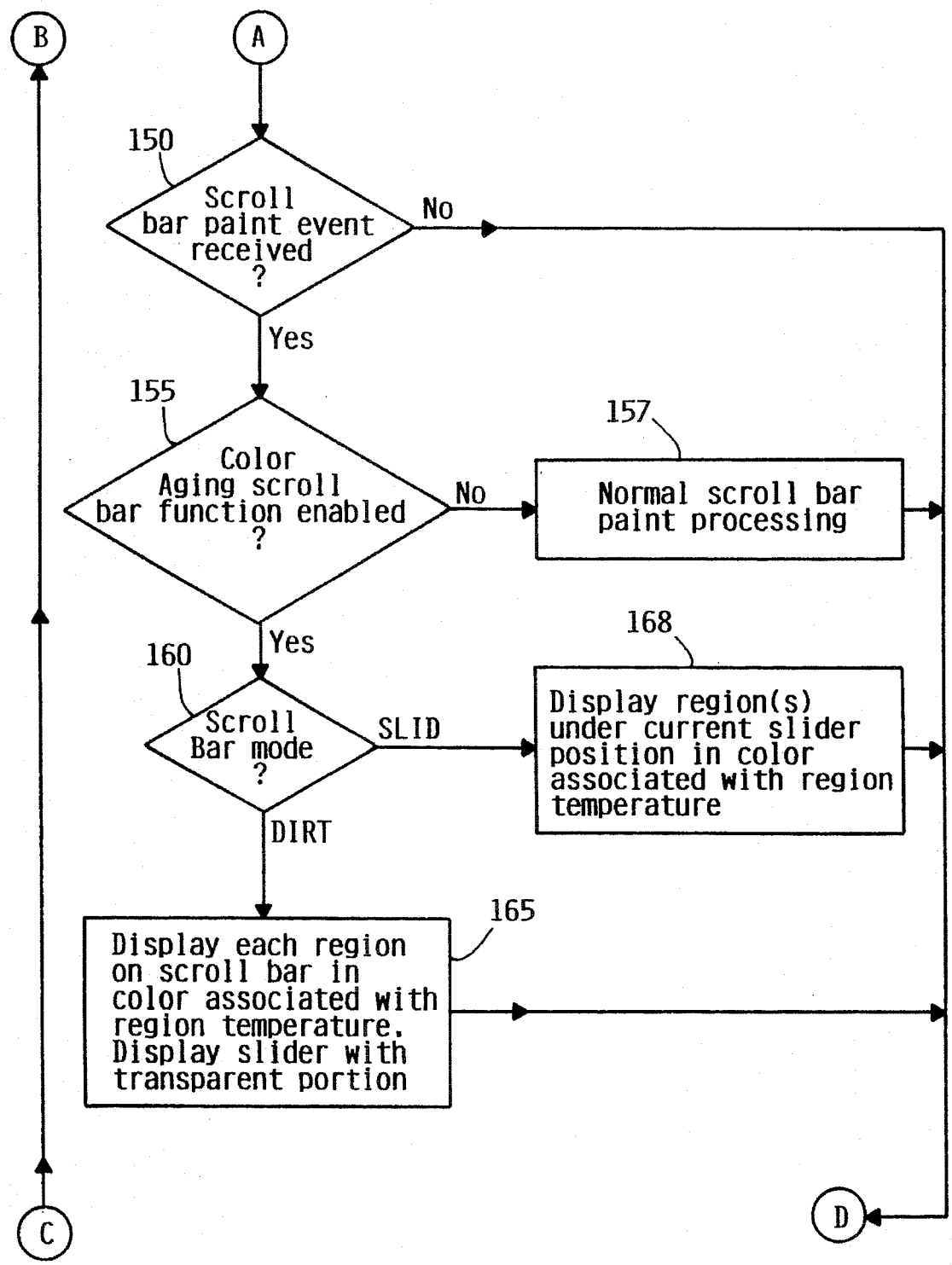
Figure 5B:
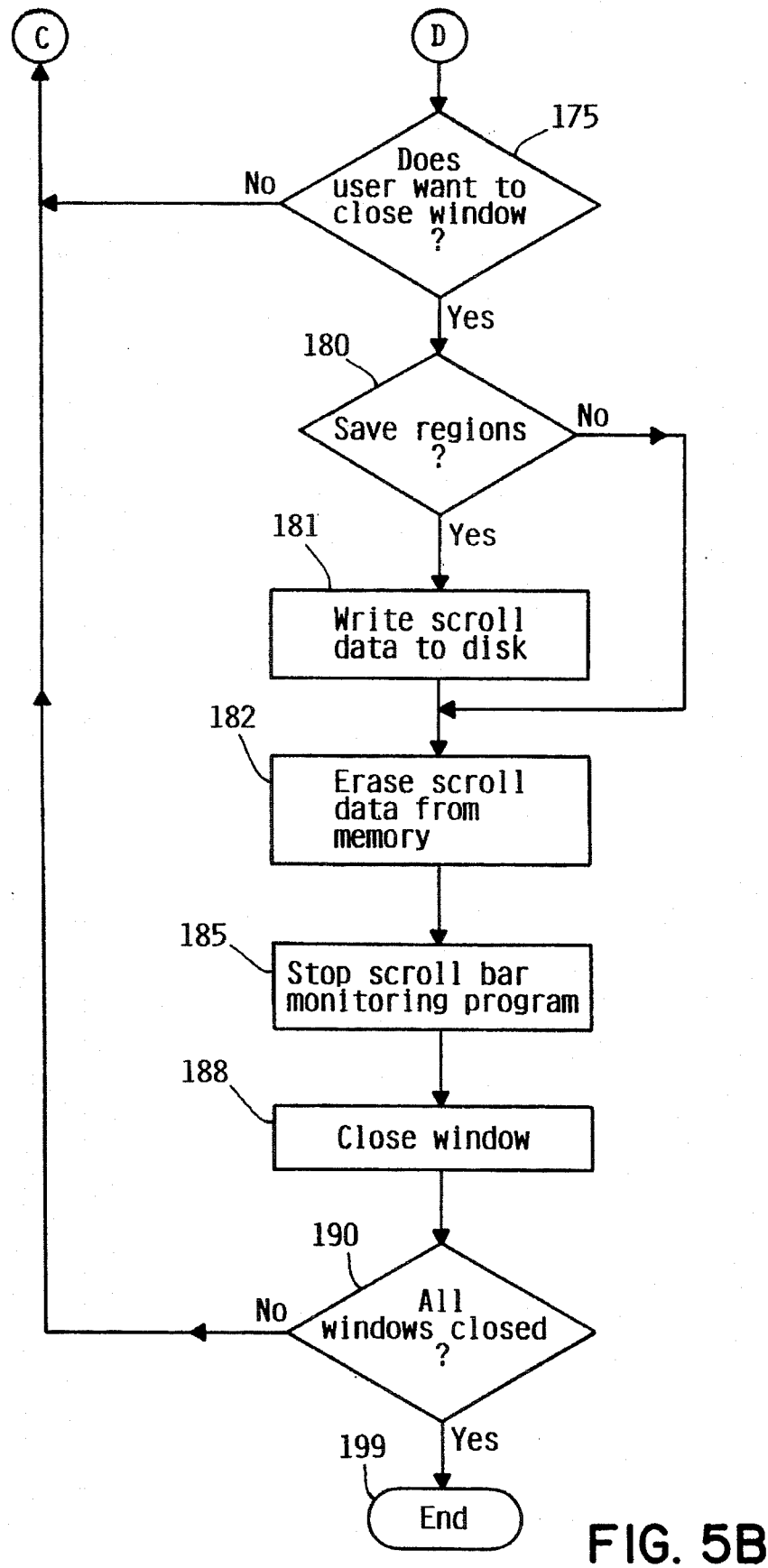
Figure 6B:
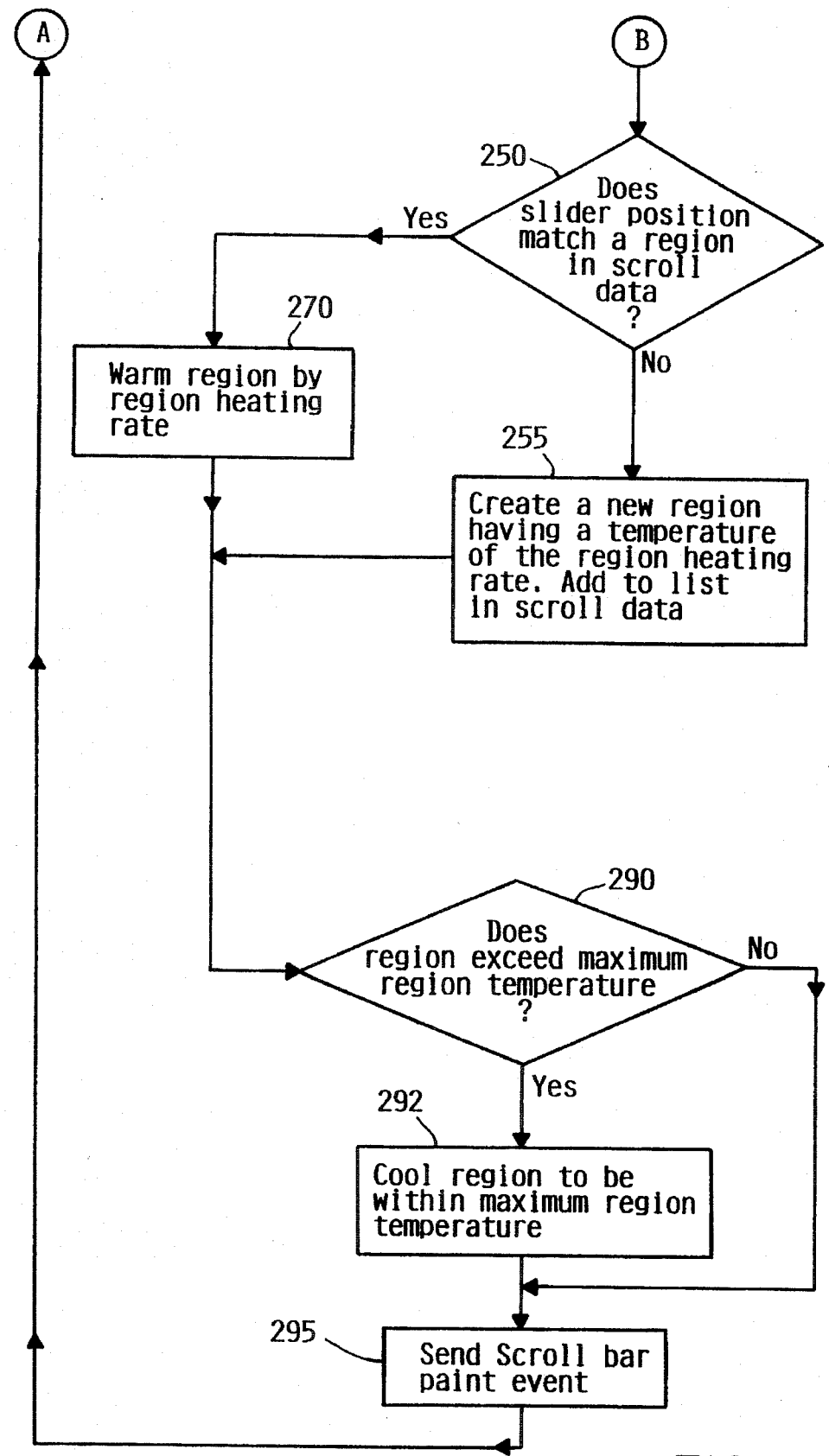

In a second alternate embodiment, the preferred embodiment can be further modified by inserting a block 121 between blocks 120 and block 122 in FIG. 5A that resets the elapsed time of the sampling period back to zero whenever the user changes the current position in the document. This would assure that any "heating" of a region was due to time actually spent in the region instead of just happening to be scrolling through the region when the sampling period expired.

In a third alternate embodiment, the preferred embodiment can be modified by suspending the sampling when a user leaves but does not close a window, thereby generating a "suspend sampling" request that is executed by block 204 of FIG. 6A. Of course, sampling is automatically resumed once a window is re-entered.

In a fourth alternate embodiment, both the timer based aging of the preferred embodiment and the event based aging of the first alternate embodiment can be modified by changing the rate of cooling to be non-linear. For example, the cooling rate of block 227 of FIG. 6A and the Cooling Factor of block 634 of FIG. 8B could be modified to cool as a percentage (e.g., 90% per timer sample or 80% per minute) of the old temperature.

In a fifth alternate embodiment, an application program could influence the heating and cooling rates/factors of the preferred and first alternate embodiments by a multiplication factor of greater than or less than one. For example, this multiplication factor could be based on window size, where small windows have greater heating and cooling rates/factors (i.e. multiplication factor>1) than normal sized windows (i.e. multiplication factor=1), and large sized windows (i.e. multiplication factor<1) have slower heating and cooling rates/factors.

In a sixth alternate embodiment, a Hottest Region Differential parameter is added to the parameter lists of FIG. 4A of the preferred embodiment and FIG. 7 of the first alternate embodiment. This parameter assures that no single region becomes "too hot" with respect to the other regions. For example, a Hottest Region Parameter of 30 degrees will assure that no one region can be 30 degrees hotter than the next hottest region. Block 290 of FIG. 6B and block 638 of FIG. 8B assure that this Hottest Region Differential Parameter is not exceeded. This provides a further check against the "bathroom break" problem and other interruptions discussed above.

A seventh alternate embodiment adds an Inactivity Timeout parameter to the parameter lists of FIG. 4A of the preferred embodiment and FIG. 7 of the first alternate embodiment. If the period specified by the Inactivity Timeout parameter is exceeded, aging is not performed during this period of inactivity. This could be performed by adding a block 212 between blocks 210 and 215 of FIG. 6A, to check for this condition, and looping back to block 201 without aging if the Inactivity Timeout period has lapsed. Likewise, blocks 635 and 638 in FIG. 8B will first check to see if the Inactivity Timeout period has lapsed before doing any aging. This alternate embodiment allows another way of addressing the "bathroom break" problem.

While this invention has been described with respect to the preferred embodiment, it will be understood by those skilled in the art that various changes in detail may be made therein without departing from the spirit, scope and teaching of the invention. For example, the actual appearance of the scroll bar may change from what is known today, and it may even be called something completely different, even though it has an equivalent function to the scroll bars known today. Accordingly, the herein disclosed is to be limited only as specified in the following claims.

What is claimed is:

1. A computer system having a display and a scroll bar, comprising:

means for determining that a slider is located at a first position, said slider being located within said scroll bar;

means for retrieving a first clock time from said computer system;

means for storing said first clock time;

means for detecting that said slider has moved to a second position;

means for retrieving a second clock time from said computer system;

means for creating a first region in said scroll bar, said first region having an upper boundary and a lower boundary and including said first position; and first means for changing the visual appearance of said first region in said scroll bar based on the length of time between said second clock time and said first clock time;

means for storing said second clock time; and means for displaying said slider at said second location.

2. The computer system of claim 1, further comprising:

means for detecting that said slider has moved to a third position;

means for retrieving a third clock time from said computer system;

means for creating a second region in said scroll bar, said second region having an upper boundary and a lower boundary and including said second position;

second means for changing the visual appearance of said first region in said scroll bar based on the length of time between said third clock time and said second clock time;

means for changing the visual appearance of said second region in said scroll bar based on the length of time between said third clock time and said second clock time;

means for storing said third clock time; and means for displaying said slider at said third location.

3. The computer system of claim 1, further comprising:

means for determining that said first region has exceeded a maximum symbolic temperature; and means for controlling said means for changing the visual appearance of said first region in said scroll bar such that said maximum symbolic temperature is not exceeded.

4. The computer system of claim 2, further comprising:

means for determining that said first region has dropped below a symbolic minimum temperature; and means for controlling said means for changing the visual appearance of said first region in said scroll bar such that the visual appearance of said first region in said scroll bar is the same as the visual appearance of said scroll bar.

5. The computer system of claim 1, further comprising:

a heating factor; and said first means for changing the visual appearance of said first region in said scroll bar further comprising means for multiplying said heating factor by the difference of said second clock time and said first clock time.

6. The computer system of claim 5, further comprising:

a cooling factor; and said second means for changing the visual appearance of said first region in said scroll bar further comprising means for multiplying said cooling factor by the difference of said second clock time and said first clock time.

7. A computer system having a display displaying a first window and a second window, said first window having a scroll bar, said first window being an active window, said second window being an inactive window, said computer system comprising:

means for determining that a slider is located at a first position, said slider being located within said scroll bar;

means for retrieving a first clock time from said computer system;

means for storing said first clock time;

means for detecting that said second window has been activated;

means for retrieving a second clock time from said computer system;

means for creating a first region in said scroll bar, said first region having an upper boundary and a lower boundary and including said first position;

means for changing the visual appearance of said first region in said scroll bar based on the length of time between said second clock time and said first clock time;

means for storing said second clock time; and means for deactivating said first window.

8. The computer system of claim 7, further comprising:

means for detecting that said first window has been activated;

means for retrieving a third clock time from said computer system;

means for changing the visual appearance of said first region in said scroll bar based on the length of time between said third clock time and said second clock time;

means for storing said third clock time; and means for deactivating said second window.

9. A method for creating a visually aging scroll bar displayed on a computer display connected to a computer system, said method comprising the machine executed steps of:

determining that a slider is located at a first position, said slider being located within said scroll bar;

retrieving a first clock time from said computer system;

storing said first clock time;

detecting that said slider has moved to a second position;

retrieving a second clock time from said computer system;

creating a first region in said scroll bar, said first region having an upper boundary and a lower boundary and including said first position;

changing the visual appearance of said first region in said scroll bar based on the length of time between said second clock time and said first clock time;

storing said second clock time; and displaying said slider at said second location.

10. The method of claim 9, further comprising the steps of:

detecting that said slider has moved to a third position;

retrieving a third clock time from said computer system;

creating a second region in said scroll bar, said second region having an upper boundary and a lower boundary and including said second position;

changing the visual appearance of said first region in said scroll bar based on the length of time between said third clock time and said second clock time;

changing the visual appearance of said second region in said scroll bar based on the length of time between said third clock time and said second clock time;

storing said third clock time; and displaying said slider at said third location.

11. A computer system, said computer system comprising:

a processor;

a computer system display;

memory; and a scroll bar mechanism that is stored in said memory for execution by said processor, said scroll bar mechanism being used to display a scroll bar on said computer system display, said scroll bar containing a slider, said scroll bar mechanism receiving events that contain information about where said slider is positioned on said scroll bar, said events being used by said scroll bar mechanism to create regions on said slider, said scroll bar mechanism causing said regions to change appearance based on a length of time between said events.

12. A program product, said program product comprising:

a recordable media; and a scroll bar mechanism recorded on said recordable media, said scroll bar mechanism being used to display a scroll bar on said computer system display, said scroll bar containing a slider, said scroll bar mechanism receiving events that contain information about where said slider is positioned on said scroll bar, said events being used by said scroll bar mechanism to create regions on said slider, said scroll bar mechanism causing said regions to change appearance based on a length of time between said events.

13. A method for transmitting a program product from a first computer system to a second computer system, said method comprising the steps of:

establishing a connection between said first computer system and said second computer system; and transmitting a program product from said first computer system to said second computer system using said connection, said program product being a scroll bar mechanism, said scroll bar mechanism being used to display a scroll bar on said computer system display, said scroll bar containing a slider, said scroll bar mechanism receiving events that contain information about where said slider is positioned on said scroll bar, said events being used by said scroll bar mechanism to create regions on said slider, said scroll bar mechanism causing said regions to change appearance based on a length of time between said events.

* * * * *

UNITED STATES PATENT AND TRADEMARK OFFICE
CERTIFICATE OF CORRECTION

PATENT NO. : 5,532,715

DATED : July 2, 1996

INVENTOR(S) : Cary L. Bates, Jerry A. Blades, Harvey G. Kiel, Raymond F. Romon, and Jeffrey M. Ryan It is certified that error appears in the above-identified patent and that said Letters Patent is hereby corrected as shown below:

Claim 11, Col. 15, Line 14, "slider" should be --scroll bar--.

Claim 12, Col. 16, Line 3, "slider" should be --scroll bar--.

Claim 13, Col. 16, Line 20, "slider" should be --scroll bar--.

Signed and Sealed this

Twenty-ninth Day of April, 1997

Attest:

BRUCE LEHMAN

Attesting Officer

Commissioner of Patents and Trademarks